United States Patent
Chen

(10) Patent No.: US 9,489,318 B2
(45) Date of Patent: Nov. 8, 2016

(54) METHOD AND SYSTEM FOR ACCESSING PROTECTED MEMORY

(75) Inventor: Iue-Shuenn Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 569 days.

(21) Appl. No.: 11/620,885

(22) Filed: Jan. 8, 2007

(65) Prior Publication Data

US 2007/0294497 A1 Dec. 20, 2007

Related U.S. Application Data

(60) Provisional application No. 60/814,942, filed on Jun. 19, 2006.

(51) Int. Cl.
*G06F 12/14* (2006.01)

(52) U.S. Cl.
CPC .................. *G06F 12/1466* (2013.01)

(58) Field of Classification Search
CPC .... G06F 21/78; G06F 12/1466; G06F 12/14; G06F 21/62; G06F 21/77; G06F 21/10; G06F 12/1425; G06F 21/00; G06F 21/31; G06F 3/0637; G06F 3/062
USPC .................................. 711/163–164
See application file for complete search history.

(56) References Cited

U.S. PATENT DOCUMENTS

| | | |
|---|---|---|
| 5,014,191 A | 5/1991 | Padgaonkar et al. |
| 5,206,714 A | 4/1993 | Kim |
| 5,319,705 A | 6/1994 | Halter et al. |
| 5,530,749 A | 6/1996 | Easter |
| 5,557,743 A | 9/1996 | Pombo et al. |
| 5,623,637 A | 4/1997 | Jones et al. |

(Continued)

FOREIGN PATENT DOCUMENTS

| | | |
|---|---|---|
| EP | 1 612 684 A1 | 1/2006 |
| EP | 1 612 684 B1 | 9/2009 |

(Continued)

OTHER PUBLICATIONS

Definition of 'computer code', from the Free Online Dictionary http://www.thefreedictionary.com/computer-code, Jul. 1, 2013, 2 pages.

(Continued)

*Primary Examiner* — Jasmine Song
(74) *Attorney, Agent, or Firm* — Sterne, Kessler, Goldstein & Fox PLLC

(57) ABSTRACT

Methods and systems for accessing protected memory are disclosed. Aspects of one method may include enabling access to protected memory on a chip when a user access key for the chip matches a customer specific access key that is pre-programmed and stored in a one-time programmable memory within the chip. The protected memory in the chip may comprise non-volatile memory. Portions of the protected memory may be allocated for access by different users. Accordingly, each user may have a different user access key to access the portion of the protected memory allocated to that user. A user may use offset to objects when sending commands to access the protected memory. The object may indicate memory address and data size. This may allow a level of abstraction where a customer may not need to know specific addresses for the portion of the protected memory being accessed.

21 Claims, 7 Drawing Sheets

(56) References Cited

U.S. PATENT DOCUMENTS

| | | | |
|---|---|---|---|
| 5,771,287 A | 6/1998 | Gilley et al. |
| 5,832,207 A | 11/1998 | Little et al. |
| 5,933,087 A | 8/1999 | Wright |
| 6,028,937 A | 2/2000 | Tatebayashi et al. |
| 6,038,563 A | 3/2000 | Bapat et al. |
| 6,182,089 B1 | 1/2001 | Ganapathy et al. |
| 6,279,063 B1 | 8/2001 | Kawasaki et al. |
| 6,317,849 B1 | 11/2001 | Patel |
| 6,381,747 B1 | 4/2002 | Wonfor et al. |
| 6,434,077 B1 | 8/2002 | Holmes |
| 6,466,048 B1 | 10/2002 | Goodman |
| 6,586,968 B1 | 7/2003 | Schauer et al. |
| 6,686,768 B2 | 2/2004 | Comer |
| 6,785,721 B1 | 8/2004 | Immerman et al. |
| 6,850,252 B1 | 2/2005 | Hoffberg |
| 6,880,005 B1 | 4/2005 | Bell et al. |
| 6,880,113 B2 | 4/2005 | Anderson et al. |
| 6,948,183 B1 | 9/2005 | Peterka |
| 6,950,818 B2 | 9/2005 | Dennis et al. |
| 6,970,462 B1 | 11/2005 | McRae |
| 6,992,945 B2 | 1/2006 | Otsuka |
| 7,147,558 B2 | 12/2006 | Giobbi |
| 7,167,077 B2 | 1/2007 | Grassl |
| 7,176,791 B2 | 2/2007 | Sakaki et al. |
| 7,227,842 B1 | 6/2007 | Ji et al. |
| 7,236,493 B1 | 6/2007 | McRae |
| 7,263,367 B1 | 8/2007 | Sabot |
| 7,317,723 B1 | 1/2008 | Guru |
| 7,340,469 B1 | 3/2008 | Alghathbar et al. |
| 7,350,204 B2 | 3/2008 | Lambert et al. |
| 7,409,707 B2 | 8/2008 | Swander et al. |
| 7,444,682 B2 * | 10/2008 | Li et al. ........................ 726/32 |
| 7,445,148 B2 * | 11/2008 | Uchida et al. ................ 235/380 |
| 7,484,237 B2 | 1/2009 | Joly et al. |
| 7,487,424 B2 | 2/2009 | Nam et al. |
| 7,489,779 B2 | 2/2009 | Scheuermann |
| 7,490,333 B2 | 2/2009 | Grimaud et al. |
| 7,509,673 B2 | 3/2009 | Swander et al. |
| 7,518,605 B2 | 4/2009 | Lin et al. |
| 7,549,159 B2 | 6/2009 | Shay |
| 7,565,553 B2 | 7/2009 | Hunter et al. |
| 7,590,860 B2 | 9/2009 | Leporini et al. |
| 7,624,424 B2 | 11/2009 | Morita et al. |
| 7,647,329 B1 | 1/2010 | Fischman et al. |
| 7,844,996 B2 | 11/2010 | Chen et al. |
| 7,913,289 B2 | 3/2011 | Chen et al. |
| 8,347,357 B2 | 1/2013 | Chen et al. |
| 9,177,176 B2 | 11/2015 | Chen |
| 2002/0059623 A1 | 5/2002 | Rodriguez et al. |
| 2002/0099952 A1 | 7/2002 | Lambert et al. |
| 2002/0138749 A1 | 9/2002 | Koguchi et al. |
| 2002/0184512 A1 | 12/2002 | Cardoso, Jr. |
| 2003/0041267 A1 | 2/2003 | Fee et al. |
| 2003/0065982 A1 | 4/2003 | Grimaud et al. |
| 2003/0070091 A1 | 4/2003 | Loveland |
| 2003/0081784 A1 | 5/2003 | Kallahalla et al. |
| 2003/0088786 A1 | 5/2003 | Moran et al. |
| 2003/0115417 A1 | 6/2003 | Corrigan |
| 2003/0140245 A1 | 7/2003 | Dahan et al. |
| 2003/0217322 A1 | 11/2003 | Rodgers |
| 2003/0221030 A1 | 11/2003 | Pontius et al. |
| 2003/0226029 A1 | 12/2003 | Porter et al. |
| 2004/0086127 A1 | 5/2004 | Candelore |
| 2004/0088558 A1 | 5/2004 | Candelore |
| 2004/0170068 A1 | 9/2004 | Williams |
| 2004/0190558 A1 | 9/2004 | Oliver |
| 2004/0250131 A1 | 12/2004 | Swander et al. |
| 2005/0010765 A1 | 1/2005 | Swander et al. |
| 2005/0021980 A1 | 1/2005 | Kanai |
| 2005/0022010 A1 | 1/2005 | Swander et al. |
| 2005/0114616 A1 | 5/2005 | Tune et al. |
| 2005/0144475 A1 | 6/2005 | Sakaki et al. |
| 2005/0213766 A1 | 9/2005 | Goss |
| 2005/0234907 A1 | 10/2005 | Yamagishi et al. |
| 2005/0242924 A1 | 11/2005 | Yosim et al. |
| 2005/0262132 A1 | 11/2005 | Morita et al. |
| 2005/0262569 A1 | 11/2005 | Shay |
| 2005/0262570 A1 | 11/2005 | Shay |
| 2005/0268342 A1 | 12/2005 | Shay |
| 2005/0278483 A1 | 12/2005 | Andruszkiewicz et al. |
| 2006/0004536 A1 | 1/2006 | Diamond |
| 2006/0015947 A1 | 1/2006 | Conti et al. |
| 2006/0031685 A1 | 2/2006 | Chen et al. |
| 2006/0044861 A1 | 3/2006 | Smith et al. |
| 2006/0075508 A1 | 4/2006 | Guo et al. |
| 2006/0090084 A1 | 4/2006 | Buer |
| 2006/0145291 A1 | 7/2006 | Badami et al. |
| 2006/0149958 A1 | 7/2006 | Omathuna |
| 2006/0161829 A1 | 7/2006 | Kobayashi |
| 2006/0236408 A1 | 10/2006 | Van |
| 2006/0265733 A1 | 11/2006 | Chen et al. |
| 2006/0265734 A1 | 11/2006 | Chen et al. |
| 2006/0272027 A1 * | 11/2006 | Noble ............................ 726/27 |
| 2006/0294575 A1 | 12/2006 | Rogers |
| 2007/0157000 A1 * | 7/2007 | Qawami et al. .............. 711/170 |
| 2007/0169173 A1 | 7/2007 | Brown et al. |
| 2007/0176756 A1 | 8/2007 | Friedrich |
| 2007/0192839 A1 | 8/2007 | Fee et al. |
| 2007/0209072 A1 | 9/2007 | Chen |
| 2007/0290715 A1 | 12/2007 | Baer et al. |
| 2007/0294745 A1 | 12/2007 | Tan et al. |
| 2008/0005586 A1 | 1/2008 | Munguia |
| 2008/0271164 A1 | 10/2008 | Dellow et al. |
| 2009/0285280 A1 | 11/2009 | Newberry et al. |
| 2009/0313461 A1 | 12/2009 | Klug |
| 2011/0197069 A9 | 8/2011 | Rodgers et al. |

FOREIGN PATENT DOCUMENTS

| | | |
|---|---|---|
| WO | WO 97/25675 | 7/1997 |
| WO | WO 99/14881 | 3/1999 |

OTHER PUBLICATIONS

EPO Communication pursuant to Article 94(3) EPC, dated Mar. 16, 2010, for European Patent Application No. 06021663.7-2212, 3 pages.

EPO Communication pursuant to Article 94(3) EPC, dated Jul. 23, 2010, for European Patent Application No. 07000798.4—1245, 7 pages.

Extended European Search Report, dated Dec. 16, 2008, for European Patent Application No. 06021663.7-2212, 3 pages.

Federal Information Processing Standards Publication, Fips Pub 46-3, Data Encryption Standard (DES), Oct. 25, 1999, 25 pages.

\* cited by examiner

| Offset 352 | Memory Address 354 | Number of data bits 356 |
|---|---|---|
| 0 | | |
| 1 | | |
| ... | | |
| M-1 | | |
| M | | |

Object 0
Object 1
Object M-1
Object M

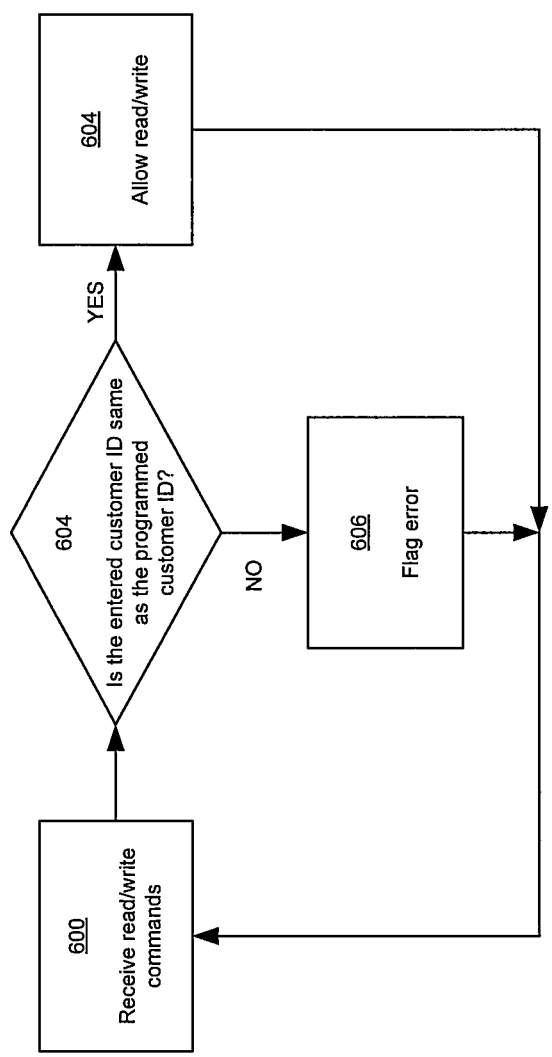

METHOD AND SYSTEM FOR ACCESSING PROTECTED MEMORY

CROSS-REFERENCE TO RELATED APPLICATIONS/INCORPORATION BY REFERENCE

This application makes reference to, claims priority to, and claims benefit of U.S. Provisional Application Ser. No. 60/814,942 filed Jun. 19, 2006.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to secure communication systems. More specifically, certain embodiments of the invention relate to a method and system for accessing protected memory.

BACKGROUND OF THE INVENTION

In an increasingly security-conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access.

An example of a multimedia system that may be accessed by many different users may be a set-top box where manufacturers, vendors, operators, and/or home users may have an interest in accessing at least some limited functionality of the system. In some instances, a single device, such as a security processor for example, may be utilized to administer security operations in the multimedia system. The security processor may operate independently of other components in the multimedia system when determining rights or privileges of different users to various features in the multimedia system. For example, vendors may have limited access to some of the functions that may be accessible by the manufacturer. Home users may only have access to a subset of the vendors' access rights. In some instances, secure operations may be managed by specifying, in a single location, secure conditions for each security component supported by the system.

However, there may be several limitations with such a straightforward implementation. On a typical security system, the number of user modes and security components may be sufficiently large that the size of the security management and/or control information may require large amounts of memory. There may be a significant number of access control entries that may correspond to instances when access rights may not be granted and/or instances when the access rights may be the same for multiple user modes and/or for multiple security components, such as default settings, for example. The addition or removal of user modes or security components may pose various implementation challenges, which increases hardware and/or software complexity. As software and/or hardware complexity increases, it may become more challenging to manage security operations without introducing security breaches or other concerns.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for accessing protected memory, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3B is a diagram illustrating exemplary list of objects for accessing an NVM, in accordance with an embodiment of the invention.

FIG. 6 is a flow chart illustrating exemplary steps for accessing non-volatile memory in an integrated circuit, in accordance with an embodiment of the invention.

DETAILED DESCRIPTION OF THE INVENTION

Certain embodiments of the invention may be found in a method and system for accessing protected memory. Aspects of the method may comprise enabling access to protected memory on a chip when a user access key communicated to a chip matches a customer specific access key that is pre-programmed and stored in a one-time programmable memory within the chip. An access may comprise read and/or write operations. The protected memory in the chip may comprise non-volatile memory. Portions of the protected memory may be allocated for access by different users. Accordingly, each user may have a different user access key to access the portion of the protected memory allocated to that user.

Various embodiments of the invention may allow pre-programming of at least one memory location in the portions of the protected memory. This may allow, for example, the chip to function in a basic manner or a particular mode such as a default mode. Each customer may have use of, for example, a list of objects, where an object may indicate an address to a portion of the protected memory. An object in the list of objects may indicate data size associated with the address to the portion of the protected memory. The object in the list of objects may be accessed via an offset, where the offset for an object may be with respect to a first object in the list of objects. Accordingly, an object offset may be communicated with a command, rather than an address of the protected memory. This may allow a level of abstraction where a customer may not need to know specific addresses for the portion of the protected memory that customer has access to.

Figure 1:
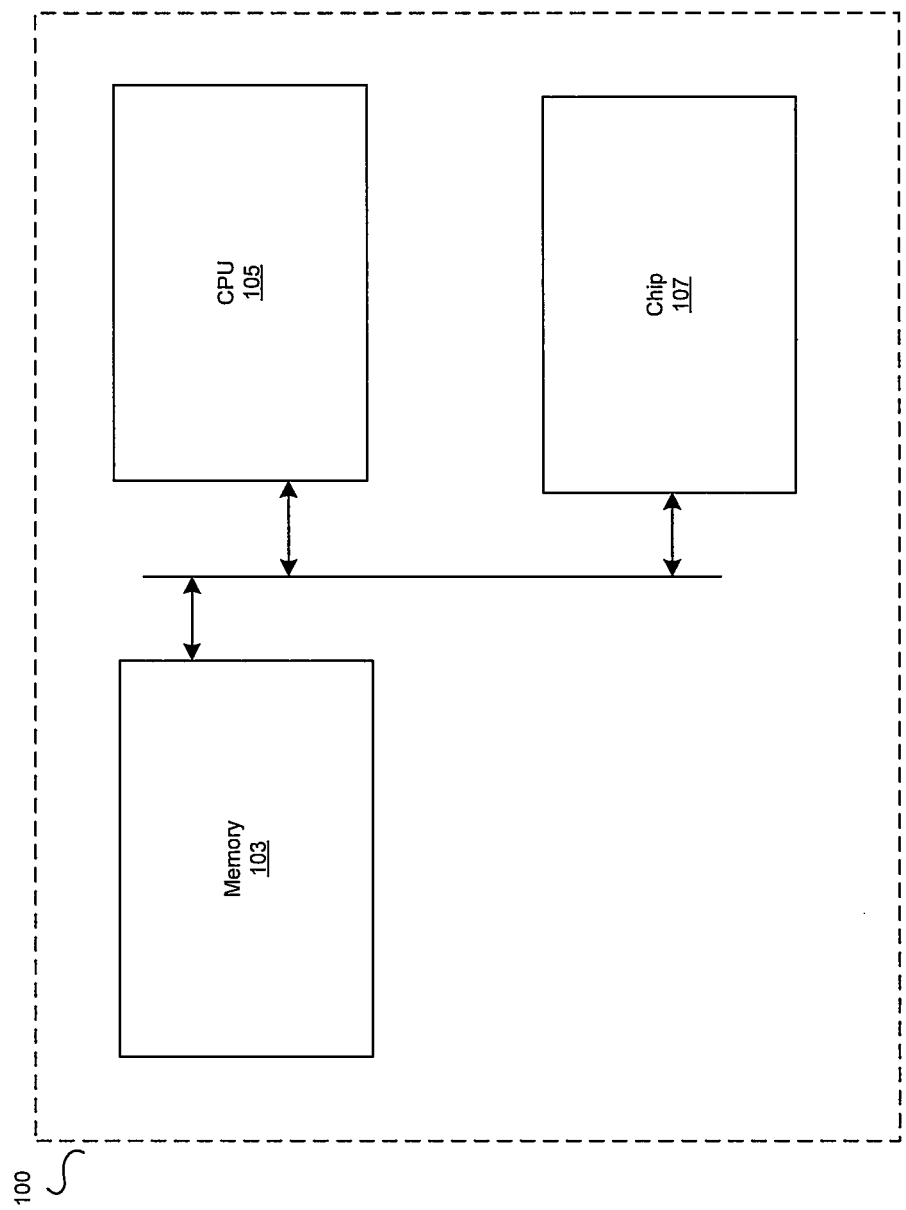
FIG. 1 is a block diagram illustrating an exemplary processing system, which may be utilized in connection with an embodiment of the invention.

FIG. 1 is a block diagram illustrating an exemplary processing system, which may be utilized in connection with an embodiment of the invention. Referring to FIG. 1, there is shown an exemplary processing system 100 comprising exemplary components such as a memory block 103, a processor 105, a chip 107. The system 100 may comprise, for example, a multi-media system such as a set-top box. In one embodiment of the invention, the chip 107 may be a security chip. The processor 105 may communicate with the memory block 103, and the chip 107, for example. The memory block 103 may comprise suitable logic, circuitry, and/or code that may store data. The data stored in the memory block 103 may be accessed by other processing blocks, for example, the processor 105.

The processor 105 may boot up upon power up of the exemplary processing system 100, or upon a reset of the exemplary processing system 100. The processor 105 may comprise suitable logic, circuitry, and/or code that may process data that may be read from, for example, the memory block 103. The processor 105 may store data in the memory block 103, and/or communicate data, status, and/or commands with other devices in the exemplary processing system 100, for example, the chip 107.

The chip 107 may comprise suitable logic, circuitry, and/or code that may be adapted for use in allowing, for example, a manufacturer of the exemplary processing system 100 or a user of the exemplary processing system 100 to write data to non-volatile memory in the chip 107. For example, if the exemplary processing system 100 is a set-top box, the exemplary processing system 100 may comprise information that allows access to certain portions of the exemplary processing system 100 to validate reception of premium programming and/or pay-per-view programming. In an exemplary embodiment of the invention, this may be accomplished through usage of a customer specific access key that may be stored in the chip 107.

A manufacturer of the exemplary processing system 100 may also write an identification number, for example, to the chip 107. Accordingly, the exemplary processing system 100 may be enabled to identify itself to a host, such as, for example, cable service provider, and the host may be able to provide programming information to the exemplary processing system 100 and/or update software to the exemplary processing system 100. The manufacturer of the exemplary processing system 100 may also enable and/or disable certain functionalities in the chip 107 and/or the exemplary processing system 100 via data written to the chip 107. For example, the chip 107 may be a chip that may be used in a set-top box for either satellite communication or cable television. Accordingly, the manufacturer may program the chip 107 for satellite reception for satellite set-top boxes, and may program the chip 107 for cable reception for cable set-top boxes. Accordingly, by appropriately programming the chip 107, the manufacturer of the exemplary processing system 100 may be able to use the same chip for different purposes.

In a similar manner, a manufacturer of the chip 107 may provide a programming interface to allow a first customer or vendor to write to the chip 107. The manufacturer of the chip 107 may then provide another programming interface to allow another customer to write to the chip 107. Accordingly, there may be a plurality of programming interfaces for use by different customers of the chip 107. A manufacturer may access a programming interface by providing, for example, a user access key. The programming interfaces may be discussed in more detail with respect to FIG. 3A. Some embodiments of the invention may utilize the processor 105 where the processor 105 may be an embedded processor in a chip that may have other functionalities. For example, the chip on which the processor 105 is embedded may comprise some or all of the circuitry of the chip 107.

Figure 2:
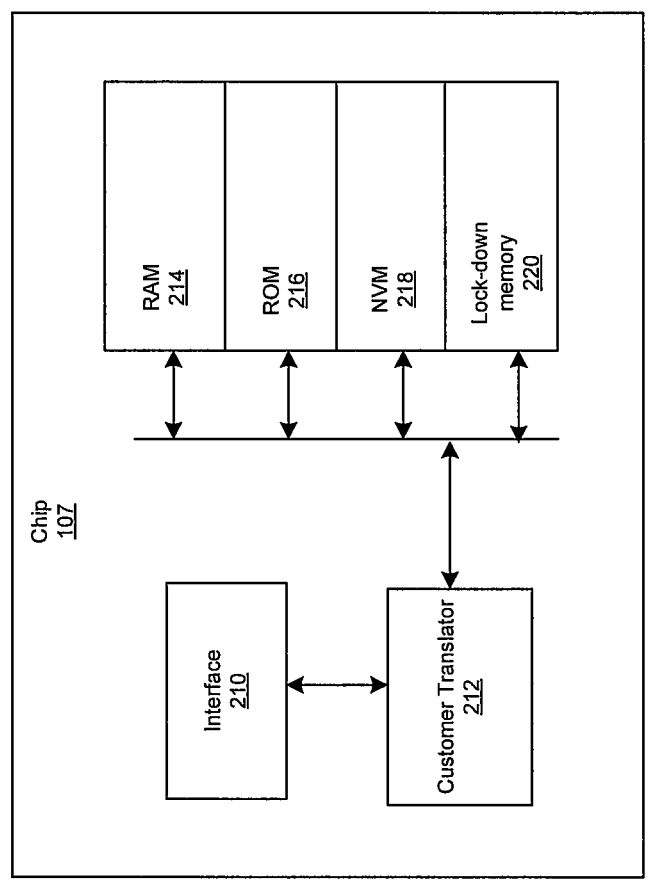
FIG. 2 is a block diagram of an exemplary integrated circuit comprising non-volatile memory, in accordance with an embodiment of the invention.

FIG. 2 is a block diagram of an exemplary integrated circuit comprising non-volatile memory, in accordance with an embodiment of the invention. Referring to FIG. 2, there is shown the chip 107 that may comprise a chip interface 210, a customer translator block 212, RAM 214, ROM 216, non-volatile memory 218, and lock-down non-volatile memory 220. The chip interface 210 may comprise suitable logic, circuitry, and/or code that may enable receiving and/or transmitting digital information. The digital information may comprise, for example, address, data, and/or commands that may be communicated to and/or from the chip 107. Accordingly, the chip interface 210 may allow data transfer via a plurality of serial and/or parallel interfaces. A parallel interface may be, for example, peripheral card interconnect (PCI), where a serial interface may be, for example, universal serial bus (USB), or another suitable interface.

The customer translator 212 may comprise suitable logic, circuitry, and/or code that may enable verification of a user access key with a stored customer specific access key for the chip 107. The customer specific access key may be stored, for example, in the lock-down non-volatile memory 220. Accordingly, if the user access key matches the stored customer specific access key, the customer translator 212 may allow access to specific portions of, for example, the NVM 218. The user access key may be, for example, part of a command to the chip 107. The user access key may also be used to determine, for example, whether the command is being sent via a correct interface. For example, the customer sending the command with the user access key may be authorized to communicate with the chip 107 via a PCI bus, or other suitable interface. Accordingly, the chip 107 may ignore all commands that are not communicated by an appropriate interface.

The customer translator 212 may also allow different programming rules for writing data and/or reading data from the NVM 218. In an exemplary embodiment of the invention, a programming rule for a customer may allow a customer to write 20 bytes with a single command where each byte may be written to specific locations in that customer's portion of the NVM 218. Another customer's command may allow toggling, for example, a single bit in a specific byte of that customer's portion of the NVM 218.

The chip 107 may use the RAM 214 to temporarily store data, for example, for use while the chip 107 is powered up. The ROM 216 may contain code that may be used to operate portions of the chip 107. In an exemplary embodiment of the invention, the ROM 216 may comprise code that allows operation of the functionality of the customer translator 212. The NVM 218 may comprise memory that may keep data even when power is turned off to the chip 107. For example, the NVM 218 may comprise EEPROM and/or FLASH memory. The NVM 218 may be used to store, for example, end user parameters. For example, if the chip 107 is used in a set-top box, these parameters may indicate channels that may be available to the end user.

The lock-down non-volatile memory 220 comprises memory that may be written once, and then locked to prevent further writes. For example, the lock-down non-volatile memory 220 may comprise a one-time programmable (OTP) memory. The lock-down non-volatile memory 220 may be written with a customer specific access key before the chip 107 is shipped to the customer. The customer may be able to write to a specific portion of the NVM 218 allocated for that customer if the user access key matches the customer specific access key stored in the lock-down non-volatile memory 220. This may help to ensure that a chip destined for a specific customer may not be used by anyone except that customer. This may also help to ensure that configuration of the chip 107 for specific functionality by a customer may not be changed by another who is not the intended customer.

In operation, the manufacturer of the chip 107 may program the lock-down non-volatile memory 220 with a customer specific access key for a customer. The chip 107 may then be shipped to the customer. The manufacturer may also communicate the user access key separately to the customer. The customer may use the user access key to configure the chip 107 for specific functionality. The customer may also enable field personnel to update the chip 107 configuration. This may occur, for example, if the customer provides cable service to end users, and the end user requests a different cable service. The chip 107 may then be re-configured to allow the different cable service to be accessible to the end user.

While an embodiment of the invention may have been described for use in a cable set-top box, the invention need not be so limited. For example, an embodiment of the invention may be used for any purpose where it may be desired to partition access to a chip. This may be used to ensure security of a chip so that access to a chip may be limited to those that have that privilege, and/or to keep the chip secure from accidental changes. This may also prevent hacking or piracy.

Figure 3A:
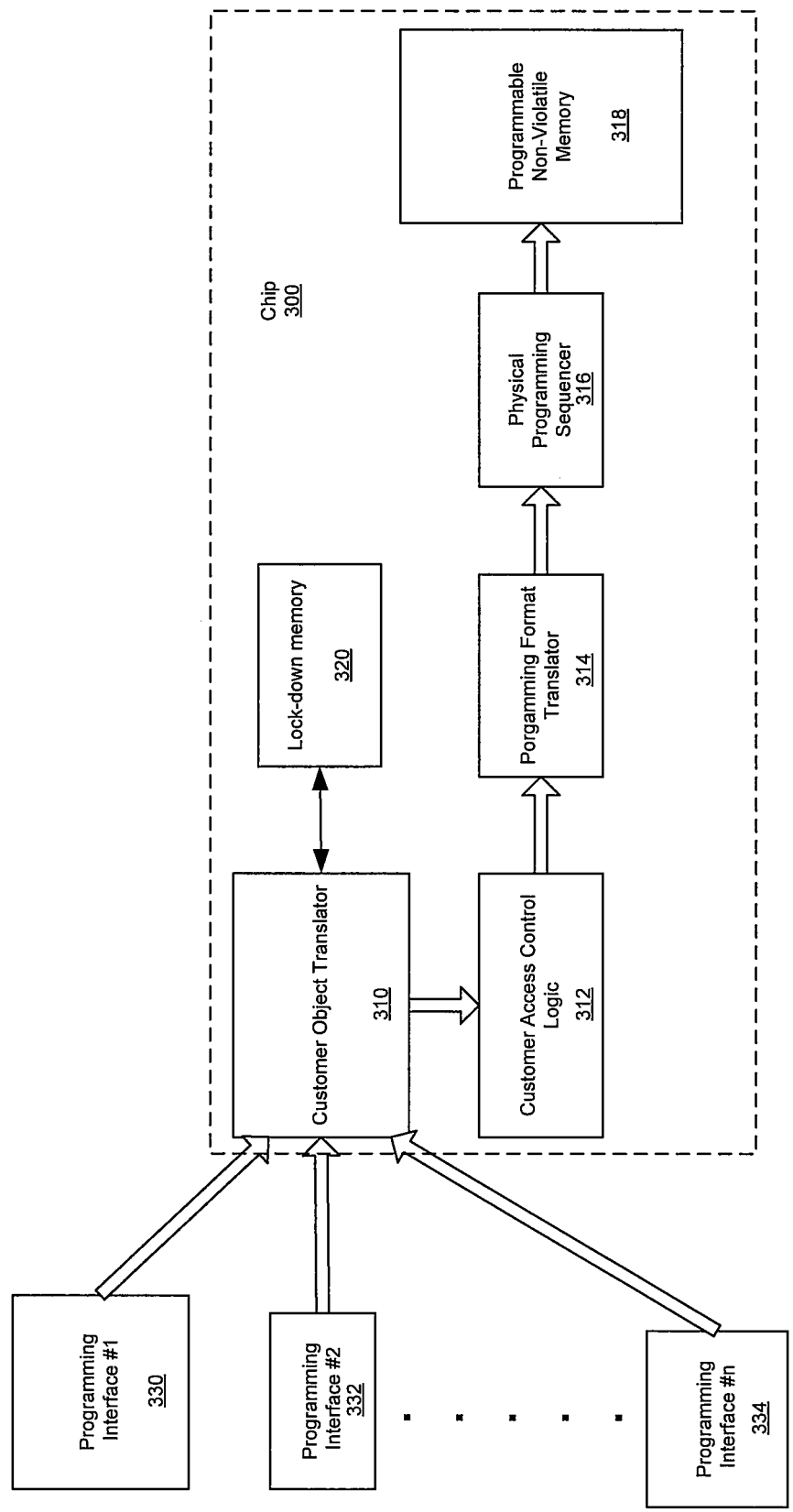
FIG. 3A is a block diagram illustrating exemplary NVM programming functionalities, in accordance with an embodiment of the invention.

FIG. 3A is a block diagram illustrating exemplary NVM programming functionalities, in accordance with an embodiment of the invention. Referring to FIG. 3A, there is shown a chip 300 that may comprise a customer object translator 310, customer access control logic 312, programming format translator 314, physical programming sequencer 316, non-volatile memory (NVM) 318, and lock-down non-volatile memory 320. There is also shown programming interfaces 330, 332, . . . , 334 by which a customer may interface with the chip 300. For example, the customer interface 330 may be a PCI bus, the customer interface 332 may be a USB interface, and the customer interface 334 may be a network interface.

The customer object translator 310 may comprise suitable logic, circuitry, and/or code that may enable verification of a user access key communicated by the customer to the chip 300. The customer object translator 310 may also enable translation of an object to a specific address location of the NVM 318, as well as the number of bits associated with that object. Objects may be pre-defined for each customer, and the specific objects may be communicated to the customer for use in accessing the NVM 318. The customer access control logic 312 may comprise suitable logic, circuitry, and/or code that may enable controlling of access to specific portions of the NVM 318 depending on the access code. Accordingly, different customers may be supported by allocating different access codes to the different customers. The different portions of the NVM 318 may be pre-programmed, for example, with different configuration data for the different customers.

The programming format translator 314 may comprise suitable logic, circuitry, and/or code that may enable formatting of received data appropriately for writing to the NVM 318. For example, the programming format translator 314 may align the data to be written to appropriate bit positions. This may be utilized in instances where the processor 105 may communicate data, for example, in little-endian format, while the data in the NVM 318 may need to be stored in big-endian format. Similarly, the programming format translator 314 may format data read from the NVM 318 appropriately to communicate to, for example, the processor 105.

The physical programming sequencer 316 may comprise suitable logic, circuitry, and/or code that may enable reading and/or writing from the NVM 318. For example, a different command or set of commands may be communicated to the NVM 318 for byte read, page read, byte write, page write, and/or erase commands. Accordingly, depending on the type of operation indicated by the programming format translator 314, the physical programming sequencer 316 may communicate different command or commands to the NVM 318.

In operation, a customer may communicate data to and from the chip 300 as part of, for example, integration of the exemplary processing system 100. Accordingly, the chip 300 may be incorporated as part of the exemplary processing system 100, and the chip 300 may be similar to, for example, the chip 107. The customer may configure the chip 300 in a specific manner for the exemplary processing system 100, which may be, for example, a cable set top box. The customer may communicate a user access key to the chip 300 via one of the plurality of programming interfaces 330, 332, . . . , 334. The customer object translator 310 may receive the user access key. The customer object translator 310 may compare the user access key with the stored customer specific access key in the lock-down non-volatile memory 320. If the user access key matches the stored customer specific access key, the customer object translator 310 may allow access to the NVM 318. If the user access key does not match the stored customer specific access key, the customer may not be allowed access to the NVM. Accordingly, a command to read from the NVM 318 may result in random data, and a command to write to the NVM 318 may result in no write operation taking place. The specific operation when the user access key does not match the stored customer specific access key may be design dependent.

Various embodiments of the invention may use different accessing schemes. For example, a user access key may be sent once to allow access to the appropriate portion of the NVM 318 until the chip 300 is powered off. In another embodiment of the invention, the user access key may be sent with each command. Format for the data and/or commands sent to and/from the chip 300 may depend on, for example, the individual customer's desired format. For example, the customer may allow single command transfers to write a pre-defined length of word or to read a pre-defined length of word. The customer may also allow, for example, transfer of a block of digital data, where the digital data may comprise commands to be executed and data to be programmed.

An embodiment of the invention may utilize various objects, where an object may comprise an address offset and a number of data bits may be associated with the address offset. Accordingly, the objects for a particular customer may be stored in, for example, the customer object translator 310, with each object having an object offset with respect to the first object stored in the customer object translator 310. The customer may communicate the offset of the desired object to the chip 300, and the customer object translator may translate the object offset to access the appropriate address of the NVM 318. The processor 105 may communicate a read command and an object offset to the chip 300. Accordingly, the chip 300 may read an appropriate number of bits from the NVM 318 and communicate the bits to, for example, the processor 105. The processor 105 may communicate, for example, a write command, an object offset, and data to the chip 300. Accordingly, the customer object translator 310 may translate the object offset to an address in the NVM 318. The chip 300 may write the appropriate number of bits of the data to the NVM 318 at the appropriate address indicated by the object offset.

If the user access key matches the stored customer specific access key, the customer access control logic 312 may allow access to specific portions of the NVM 318. Any attempts to access an address beyond the allowed portion may, for example, result in an error. Accordingly, a read command from a non-allowed address of the NVM 318 may result in random data, and a command to write to a non-allowed address of the NVM 318 may not result in the occurrence of a write operation. The specific operation that may occur when the desired address is that of a non-allowed portion of the NVM 318 may be design dependent.

If a customer sends a correct user access key and requests access to an allowed portion of the NVM 318, the programming format translator 314 may interpret the commands sent for appropriate action. For example, the programming format translator 314 may interpret the command as a write command of a number of bits following to an address in the NVM 318. The physical programming sequencer 316 may then send appropriate device specific commands and data to the NVM 318 to write the data to the specified addresses. Similarly, the programming format translator 314 may interpret the command to be a read command for a specified number of bits starting at a specified address. Accordingly, the physical programming sequencer 316 may communicate appropriate commands to the NVM 318 to read the appropriate number of bits starting from a specified address.

An embodiment of the invention may allow one of the programming interfaces 330, 332, . . . 334 to be a test port. The test port may be used, for example, by a chip manufacturer to test the access to the NVM 318 in the chip 300. Accordingly, this may be a way to independently verify the contents of the NVM 318. The test port may be disabled, for example, before the chip 300 is shipped to the customer. Various commands such as debugging commands may also allow read and/or write to addresses in the NVM 318. This may allow the chip manufacturer to, for example, test the NVM 318. The debug commands may also be disabled before the chip is shipped to the customer.

While various functionalities may have been described with respect to various blocks in FIG. 3A, the invention need not be so limited. For example, verification of the user access key may be performed in a functional block other than the customer object translator 310. Other embodiments of the invention may group together some of the functional blocks described in FIG. 3A, such as, for example, the customer object translator 310 and the customer access control logic 312.

Figure 3B:
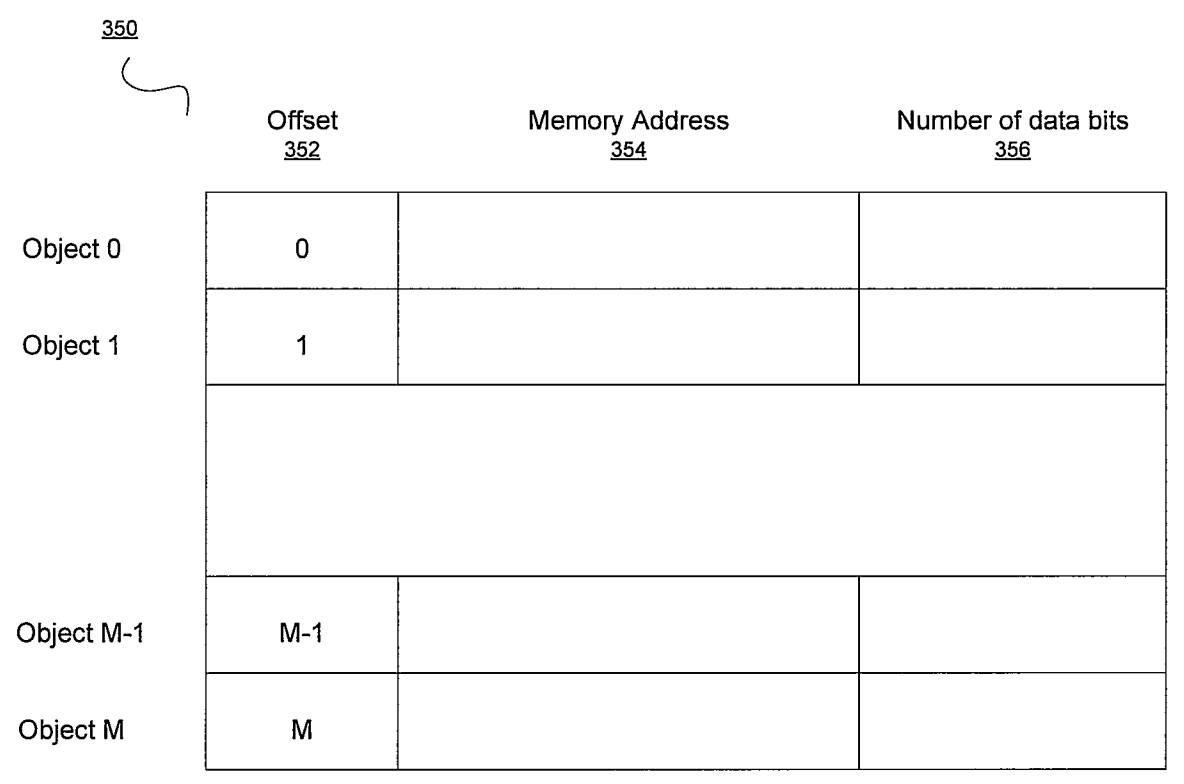

FIG. 3B is a diagram illustrating exemplary list of objects for accessing an NVM, in accordance with an embodiment of the invention. Referring to FIG. 3B, there is shown the object list 350, which may be for a specific customer. Accordingly, there may be a separate object list for each of the different customers that the chip 300 may support. The object list 350 may comprise of a plurality of rows, where each row may be an object. Each object may have associated with it, for example, an object offset 352, a memory address 354, and a number of data bits 356. The objects may be stored sequentially in, for example, the customer object translator 310. Since the object list may be for a specific customer, an object may be specified by its offset from, for example, the first object in the list. For example, the objects may be numbered from 0 to M, where the object offset of 0 may be associated with the first object, and the object offset of M may be associated with the last object.

Another embodiment of the invention may increment the offset by, for example, the number of bytes needed to hold the information associated with the object. For example, if the memory address is a 3-byte address and the number of data bits is indicated by a single byte, then the total number of bytes needed to describe each object may be 4 bytes. Accordingly, the offset may be incremented by 4 to give the offsets of 0, 4, 8, . . . 4M for the objects 0 . . . M, respectively.

The memory address 354 may be, for example, an address location in the NVM 318. This number of data bits 356 may be, for example, the number of bits to be addressed starting at the memory address 354. For example, if the number of bits to be addressed for an object is 8, the value of the number of data bits 356 for that object may be 8. If all of the objects have the same data size, then the data bits 356 may not be used.

Figure 4:
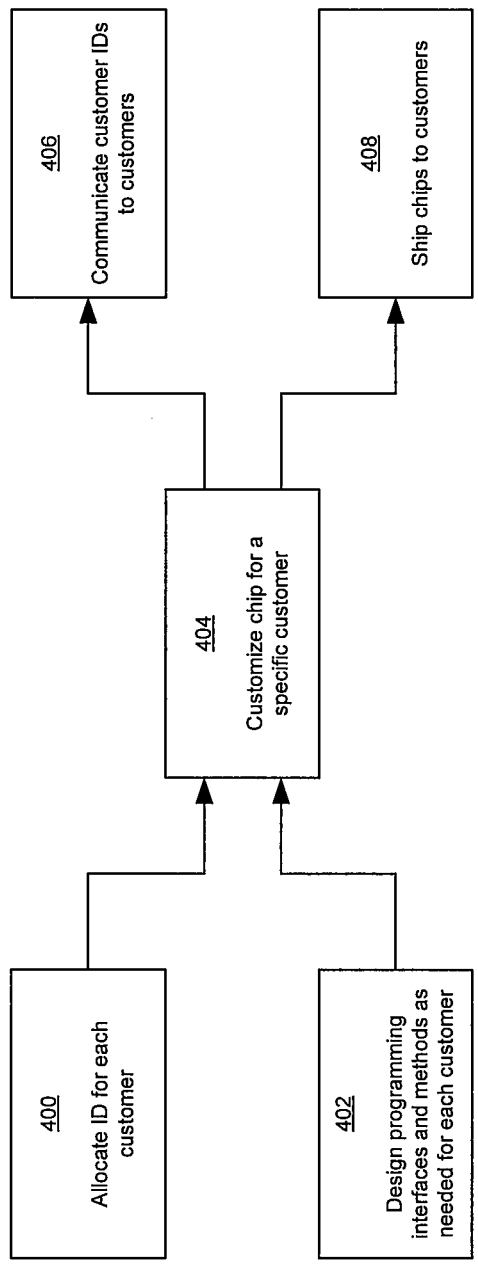
FIG. 4 is a flow chart illustrating exemplary steps in preparing an integrated circuit for programming by a customer, in accordance with an embodiment of the invention.

FIG. 4 is a flow chart illustrating exemplary steps in preparing an integrated circuit for programming by a customer, in accordance with an embodiment of the invention. Referring to FIG. 4, there are shown steps 400 to 408. In step 400, a chip manufacturer may determine the list of customers that may use the chip, for example, the chip 300. The chip manufacturer may then allocate an access key for each customer. Each access key may allow access to a specific portion of the NVM 318. In step 402, the chip manufacturer may determine a programming interface allowed for each customer. The chip manufacturer may also determine programming methods, including, for example, object types, for each customer.

In step 404, the chip manufacturer may customize the chip for the intended customer by programming the customer specific access key into, for example, the lock-down non-volatile memory 320. In step 406, the customer IDs may be communicated to the customers. Accordingly, each customer may be able to access a portion of, for example, the NVM 318 allocated to that customer. In step 408, the chips may be shipped to the customers. Each shipment of chips to a specific customer may have that customer specific access key programmed in each chip. Accordingly, a specific customer who has been communicated the user access key that matches the stored access key may be able to use the shipped chips. This may be a security feature, for example, that may render the chips useless except to the intended customer.

Figure 5:
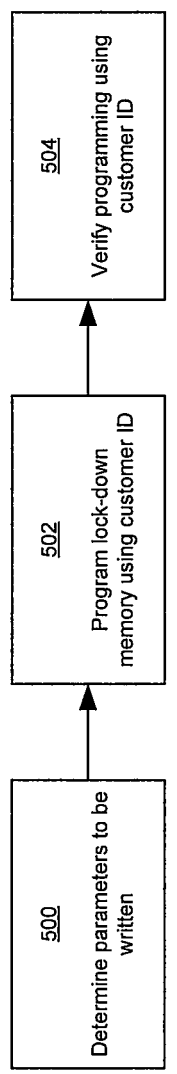
FIG. 5 is a flow chart illustrating exemplary steps for accessing non-volatile memory in an integrated circuit by a customer, in accordance with an embodiment of the invention.

FIG. 5 is a flow chart illustrating exemplary steps for accessing non-volatile memory in an integrated circuit by a customer, in accordance with an embodiment of the invention. Referring to FIG. 5, there are shown steps 500 to 504. In step 500, the customer may have received the chips that may be, for example, similar to the chip 300. The customer may determine the specific information for writing to the NVM 318. For example, the information may enable basic functionality available to all end-users who may use the chip 300 in the exemplary processing system 100. The basic functionality may allow, for example, an end user to receive basic cable channels if the chip 300 is used in a cable set top box.

In step 502, the customer may program the chip 300 using the user access key and objects defined for the customer. In step 504, the customer may verify correct programming. This may require, for example, communicating the user access key to the chip 300 again. If the information programmed in the NVM 318 in the chip 300 does not verify, at least a portion of the NVM 318 may need to be erased and/or reprogrammed.

FIG. 6 is a flow chart illustrating exemplary steps in accessing non-volatile memory in an integrated circuit, in accordance with an embodiment of the invention. Referring to FIG. 6, there are shown steps 600 to 606. In step 600, the customer object translator 310 in the chip 300 may receive commands from, for example, the processor 105. In step 604, the customer object translator 310 may verify the customer access key with the stored customer specific access key. If the user access key is verified, the next step may be step 604. If the user access key is not verified, the next step may be step 606.

In step 604, the chip 300 may allow a read and/or write to the NVM 318, as indicated by the command and/or data from, for example, the processor 105. For example, the processor 105 may have communicated a read command, write command, or a read-modify-write command. In step 606, the chip 300 may indicate an error. This may be, for example, via an interrupt to the processor 105 or by setting a flag in, for example, a specific address in the memory block 103.

In accordance with an embodiment of the invention, aspects of an exemplary system may comprise a user specific access key stored in the lock-down non-volatile memory 320 in the chip 300. The chip 300 may allow access to the NVM 318 upon verifying that a user access key communicated to the chip 300 matches the stored customer specific access key in the lock-down non-volatile memory 320. The NVM 318 may be partitioned to a plurality of portions, and at least some of these portions may be allocated for use by different users. Each of the plurality of portions of the NVM 318 may be accessed via a different user access key. The chip 300 may be shipped to a customer and at least one memory location in the plurality of portions of the NVM 318 may be pre-programmed. For example, the pre-programmed data may allow some minimal or default access to various functionalities of the chip 300.

The customer object translator 310 may comprise a list of objects for each of the users, where an object may indicate an address to a portion of the protected memory. The object may also indicate data size associated with a memory address for that object. For example, the data size may be 8 bits for one object, and 16 bits for another object. The object in the list of objects may be accessed via an offset with respect to a first object in the list of objects. Accordingly, a processor, for example, the processor 105 may read data at an address in the NVM 318 by sending a read command with the offset of the object that may be associated with the desired address in the NVM 318.

Another embodiment of the invention may provide a machine-readable storage, having stored thereon, a computer program having at least one code section executable by a machine, thereby causing the machine to perform the steps as described above for accessing protected memory.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for modifying memory, the method comprising:
   receiving a command including a user access key;
   using said user access key to determine whether said command is received via a customer-specific interface;
   ignoring said command when said command is not received via said customer-specific interface;
   permitting access to protected memory on a chip when said user access key matches a customer-specific access key stored within said chip and when it is determined that said user access key is received by said chip via said customer-specific interface; and
   when access to said protected memory is permitted, formatting information communicated to and/or from said protected memory during access of said protected memory based on one or more formatting criterion.

2. The method according to claim 1, wherein said protected memory in said chip comprises non-volatile memory.

3. The method according to claim 1, further comprising allocating a plurality of portions of said protected memory in said chip for access by different customers, wherein each of said plurality of portions of said memory on said chip is accessed via a different user access key.

4. The method according to claim 3, further comprising pre-programming at least one memory location in said plurality of portions of said protected memory.

5. The method according to claim 3, further comprising assigning a list of objects to each of said customers, wherein an object of said list of objects indicates an address to a portion of said protected memory.

6. The method according to claim 5, wherein said object in said list of objects further indicates a data size associated with said address to said portion of said protected memory.

7. The method according to claim 5, wherein said object in said list of objects is accessed via an offset with respect to another object in said list of objects.

8. A machine-readable storage having stored thereon, a computer program having at least one code section for modifying memory, the at least one code section being executable by a machine for causing the machine to:
    receive a command including a user access key;
    use said user access key to determine whether said command is received via a customer-specific interface;
    ignore said command when said command is not received via said customer-specific interface;
    permit access to protected memory on a chip when said user access key for said chip matches a customer-specific access key stored within said chip and when it is determined that said user access key is received by said chip via said customer-specific interface; and
    when access to said protected memory is permitted, format information communicated to and/or from said protected memory during access of said protected memory based on one or more formatting criterion.

9. The machine-readable storage according to claim 8, wherein said protected memory in said chip comprises non-volatile memory.

10. The machine-readable storage according to claim 8, wherein said at least one code section further causes the machine to allocate a plurality of portions of said protected memory in said chip for access by different users, wherein each of said plurality of portions of said memory on said chip is accessed via a different user access key.

11. The machine-readable storage according to claim 10, wherein said at least one code section further causes the machine to pre-program at least one memory location in said plurality of portions of said protected memory.

12. The machine-readable storage according to claim 10, wherein said at least one code section further causes the machine to assign a list of objects to each of said users, wherein an object of said list of objects indicates an address to a portion of said protected memory.

13. The machine-readable storage according to claim 12, wherein said object in said list of objects further indicates a data size associated with said address to said portion of said protected memory.

14. The machine-readable storage according to claim 12, wherein said object in said list of objects is accessed via an offset with respect to another object in said list of objects.

15. A system for modifying memory, the system comprising:
    one or more circuits in a chip that are configured to receive a command including a user access key, use said user access key to determine whether said command is received via a customer-specific interface, ignore said command when said command is not received via said customer-specific interface; permit access to protected memory on said chip when said user access key for said chip matches a customer-specific access key that is stored within said chip and when it is determined that said user access key is received by said chip via said customer-specific interface; and
    when access to said protected memory is permitted, said one or more circuits are configured to format information communicated to and/or from said protected memory during access of said protected memory based on one or more formatting criterion.

16. The system according to claim 15, wherein said protected memory in said chip comprises non-volatile memory.

17. The system according to claim 15, wherein a plurality of portions of said protected memory in said chip is allocated for access by different users, wherein each of said plurality of portions of said memory on said chip is accessed via a different user access key.

18. The system according to claim 17, wherein at least one memory location in said plurality of portions of said protected memory is pre-programmed.

19. The system according to claim 17, further comprising a customer object translator block that stores a list of objects for each of said users, wherein an object of said list of objects indicates an address to a portion of said protected memory.

20. The system according to claim 19, wherein said object in said list of objects further indicates a data size associated with said address to said portion of said protected memory.

21. The system according to claim 19, wherein said object in said list of objects is accessed via an offset with respect to another object in said list of objects.

* * * * *